(12) United States Patent  
Gutfreund (10) Patent No.: US 11,366,814 B2
(45) Date of Patent: Jun. 21, 2022

(54) SYSTEMS AND METHODS FOR FEDERATED SEARCH WITH DYNAMIC SELECTION AND DISTRIBUTED RELEVANCE

(71) Applicant: Elsevier, Inc., New York, NY (US)

(72) Inventor: Keith Gutfreund, Acton, MA (US)

(73) Assignee: ELSEVIER, Inc., New York, NY (US)

( * ) Notice: Subject to any disclaimer, the term of this patent is extended or adjusted under 35 U.S.C. 154(b) by 84 days.

(21) Appl. No.: 16/825,243

(22) Filed: Mar. 20, 2020

(65) Prior Publication Data

US 2020/0394197 A1 Dec. 17, 2020

Related U.S. Application Data

(60) Provisional application No. 62/860,380, filed on Jun. 12, 2019.

(51) Int. Cl.
*G06F 17/00* (2019.01)
*G06F 16/2457* (2019.01)
*G06F 16/242* (2019.01)

(52) U.S. Cl.
CPC ...... *G06F 16/24575* (2019.01); *G06F 16/243* (2019.01)

(58) Field of Classification Search
CPC ............. G06F 16/24575; G06F 16/243; G06F 16/3344
See application file for complete search history.

(56) References Cited

U.S. PATENT DOCUMENTS

| | | | |
|---|---|---|---|
| 7,039,634 B2 | 5/2006 | Xu et al. | |
| 8,032,550 B2 | 10/2011 | Schneider | |
| 8,321,444 B2 | 11/2012 | Mowatt et al. | |
| 8,375,046 B2 | 2/2013 | Dettinger et al. | |
| 8,996,555 B2 | 3/2015 | Kuchmann-Beauger et al. | |
| 9,098,489 B2* | 8/2015 | Zuev | G06F 16/3344 |
| 9,390,179 B2 | 7/2016 | Brette et al. | |
| 9,817,898 B2 | 11/2017 | Stevenson et al. | |
| 10,025,862 B2* | 7/2018 | Gramatica | G06F 16/93 |
| 10,055,461 B1* | 8/2018 | Bem | G06F 16/24578 |
| 2003/0225747 A1 | 12/2003 | Brown et al. | |
| 2005/0149496 A1 | 7/2005 | Mukherjee et al. | |

(Continued)

FOREIGN PATENT DOCUMENTS

KR 101646754 B1 8/2016

OTHER PUBLICATIONS

Rinat Khoussainov and Nicholas Kushmerick. Specialisation dynamics in federated web search. In Proceedings of the 6th annual ACM international workshop on Web information and data management, Association for Computing Machinery, 112-119, Nov. 2004.*

(Continued)

*Primary Examiner* — Greta L Robinson
(74) *Attorney, Agent, or Firm* — Dinsmore & Shohl LLP (57) ABSTRACT

A method comprises receiving at a computing device, a search query, performing, by the computing device, a semantic analysis of the search query to identify one or more semantic concepts contained within the query, selecting, by the computing device, one or more corpora, or portions thereof, based on the identified semantic concepts, and performing, by the computing device, a search of the one or more corpora based on the search query.

17 Claims, 7 Drawing Sheets

(56) References Cited

U.S. PATENT DOCUMENTS

2008/0201304 A1    8/2008  Sue
2014/0289636 A1*  9/2014  Johnson .............. G06F 16/9027
                                                      715/736
2015/0278198 A1*  10/2015  Andreev ............. G06F 16/3344
                                                        704/9
2016/0140187 A1    5/2016  Bae et al.
2017/0060856 A1*  3/2017  Turtle ..................... G06F 16/93

OTHER PUBLICATIONS

Y. Barhoun, R. Haque and M. Hacid, "iSeeker: Towards an Engine for Processing Aggregated Search on Linked Data," 2015 IEEE Conference on Collaboration and Internet Computing (CIC), pp. 184-191, Oct. 2015.*

* cited by examiner

SYSTEMS AND METHODS FOR FEDERATED SEARCH WITH DYNAMIC SELECTION AND DISTRIBUTED RELEVANCE

CROSS REFERENCE TO RELATED APPLICATIONS

This application claims priority to U.S. Provisional Application No. 62/860,380, filed Jun. 12, 2019, the entire contents of which is hereby incorporated by reference.

TECHNICAL FIELD

The present specification generally relates to information retrieval and, more specifically, to systems and methods for federated search with dynamic selection and distributed relevance.

BACKGROUND

Existing information retrieval or search applications typically involve a corpus comprising a large number of documents that is indexed to allow the corpus to be easily searched by a search engine. When a search query is received by a search application, the search engine searches the index of the corpus to obtain documents relevant to the query. To examine other corpora, the same search query may also be input to other search applications to perform the search over those corpora. However, performing multiple searches of different corpora using different search applications may be inexact and inefficient. It may be preferable to enter a search query once and have a search performed over multiple search applications using that single query. This may be done using federated search techniques.

Federated search allows multiple corpora to be searched based on a single search query. However, a federated search may require a user to specify the corpora or search engines that are to be part of the search, and a user may not be familiar enough with the corpora to know which are most appropriate to be searched. Thus, a user may omit important corpora from a federated search, which may result in important documents not being included in the search results. Alternatively, a user may include corpora that are not particularly relevant to the search, which may introduce irrelevant results and may needlessly slow down the search. In addition, a user may wish to perform a search over a portion or subset of documents contained in one or more corpora. This is generally not possible using typical federated search applications.

Accordingly, there exists a need for a system and/or method of analyzing a search query and determining which corpora among a plurality of corpora are appropriate for searching using the search query. In addition, there exists a need for a system and/or method of performing a search over a subset of documents within a corpus.

SUMMARY

In one embodiment, a method may include receiving, at a computing device, a search query, performing a semantic analysis of the search query to identify one or more semantic concepts contained within the query, selecting one or more corpora based on the one or more identified semantic concepts, and performing a search of the one or more corpora based on the search query.

In another embodiment, a system for performing federated search may include a processing device and a non-transitory, processor-readable storage medium comprising one or more programming instructions stored thereon. When executed, the processing instructions may cause the processing device to receive a search query from a user, perform semantic analysis of the search query and identify one or more semantic concepts contained in the search query, store data associated with a plurality of federated search endpoints and a syntax required to access each federated search endpoint, select one or more federated search endpoints from an endpoint locator service based on the semantic concepts identified by the semantic query parser, and create a formatted search query for each of the one or more federated search endpoints selected by the concept mapping service based on the search query and the syntax required to access each federated search endpoint stored in the endpoint locator service. Each federated search endpoint may be associated with a corpus of documents.

In another embodiment, a system for performing federated search may include a federation of one or more endpoints, a processing device, and a non-transitory, processor-readable storage medium comprising one or more programming instructions stored thereon. When executed, the processing device may cause the processor to receive a search query and federate the search query to one or more of the endpoints of the federation by submitting a formatted search query to each of the one or more endpoints. Each of the endpoints of the federation may be associated with a corpus of documents. Each of the endpoints of the federation may be configured to receive a formatted search query, perform a search of the corpus associated with the endpoints, and return search results along with statistics associated with relevancy of the search results.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to systems and methods for performing federated searches. A federated search involves sending a search query to a plurality of searchable content repositories or endpoints. As used herein, an endpoint is a search application capable of accessing searchable content that may receive a search query and return appropriate search results based on the query. A corresponding search engine may perform the search of the searchable content associated with an endpoint. Each endpoint may comprise a corpus of documents (e.g., articles, books, pamphlets, tutorials, images, reviews, etc.) that may be searched by a search engine based on a received query. An endpoint may comprise a corpus containing a single type of document (e.g., books) or it may comprise a corpus containing multiple types of documents (e.g., books and news articles).

In addition, each endpoint typically has a search index created from the associated corpus of documents. When building a search application, a corpus of documents is typically assembled. For some search applications, multiple existing corpora may be combined to form a uniform, composite corpus. Each such corpus may contain different types of documents. After the corpus of documents is assembled, a schema may be created that describes each portion of the documents in the corpus. This schema may be used by a search engine when performing searches of the corpus. After the schema is created, software may be used to read each document of the corpus, select portions of interest from each document according to the schema, and add each document to the index. The resulting index will comprise an association between the documents in the corpus and a plurality of terms, phrases, and concepts related to each document.

To perform a search, a search query is provided by a user to the search application. The search application may format the query to match the index schema of the search engine and may then submit the formatted query to the search engine. The search engine may then match the query against the index and return a list of matching results. By searching an index rather than the actual documents of a corpus, a search may be performed significantly faster since the size of a search index is generally much smaller than the size of the corpus itself.

In addition to returning a list of documents that match the search query, a search engine may also score the documents based on relevancy to the search query and present the documents in a ranked order based on this relevancy score. A variety of algorithms may be used by a search engine to rank documents. In some applications, documents that are more recently published may be considered more relevant. In other examples, documents that have a geographic proximity to a search query may be considered more relevant (e.g., a search for local businesses). In another example, documents containing phrases that more closely match the query may be considered more relevant. Search applications may incorporate many different factors to compute relevance rankings.

One way to rank the relevancy of documents is based on the textual or morphologic similarity of words in the query to the documents in a corpus. In particular, two statistics may be used: term frequency (TF) and inverse document frequency (IDF). The TF value of a query term is a value that is proportional to the number of times that the query term appears in a particular document. A query term may thus have a different TF value for each document in the corpus. The expectation is that documents with more matches to a query term will be more relevant than documents containing fewer matches.

The IDF value, meanwhile, is a measure of the scarcity of a query term over the entire corpus of documents. The fewer times that a term appears in the corpus, the higher the IDF score will be. Thus, common words such as "the" and "is" will have low IDF scores while words that only appear in a few documents will have high IDF scores.

The TF value and the IDF value for a query term may then be combined by multiplying or otherwise combining the TF value and the IDF value for the term to compute a term frequency-inverse document frequency (TF-IDF) score for the term. Thus, if a query term appears frequently in a particular document but does not appear frequently across the entire corpus, that document will have a high TF-IDF score for that query term, and will likely be particularly relevant to a search query containing the term.

When searching for one or more documents, a user may utilize a search application that the user believes is most likely to contain the desired documents for which the user is searching. However, a user may also desire to use multiple search applications to search multiple corpora and increase the breadth of documents searched. This may be accomplished by a user manually searching a plurality of endpoints by inputting the same or similar search query into a variety of search applications. However, this may be time consuming and it may introduce irrelevant results.

A more efficient manner of searching multiple search applications may be to utilize a metasearch application. Current metasearch applications may receive a single search query as an input and may then send that search query to multiple search applications or endpoints. The metasearch application may then receive the results from each endpoint and present a single combined list of search results to the user. While this may increase the efficiency of performing the search, there is no way for the metasearch application to compare the quality of search results returned from each endpoint. Each endpoint is typically a black box with respect to the metasearch application and generally returns a list of search results without additional information on the relevancy of the search results. Furthermore, metasearch applications typically send a query to all search endpoints without consideration of the relevance or suitability of the endpoints to the query.

The individual endpoints may provide search results in an ordered list according to relevancy to the search query; however, it may be difficult for the metasearch application and the user to compare the relevancy of search results returned by different search applications. This may be especially true when each application returns different types of documents. In addition, each search application may use a different scoring algorithm to rank search results and the algorithm used may be proprietary and non-public. To address these limitations, a federated search may be performed, as described below.

A federated search comprises simultaneously searching a plurality of endpoints that are part of a federation, combining the search results from each endpoint, and returning a single listing of search results. A federated search application may receive a search query and may send or federate the single query to multiple federated endpoints. Each endpoint may independently perform a search of one or more associated corpora and return the search results to the federated search application. The federated search application may then combine the results from each endpoint and present combined search results.

Figure 1:
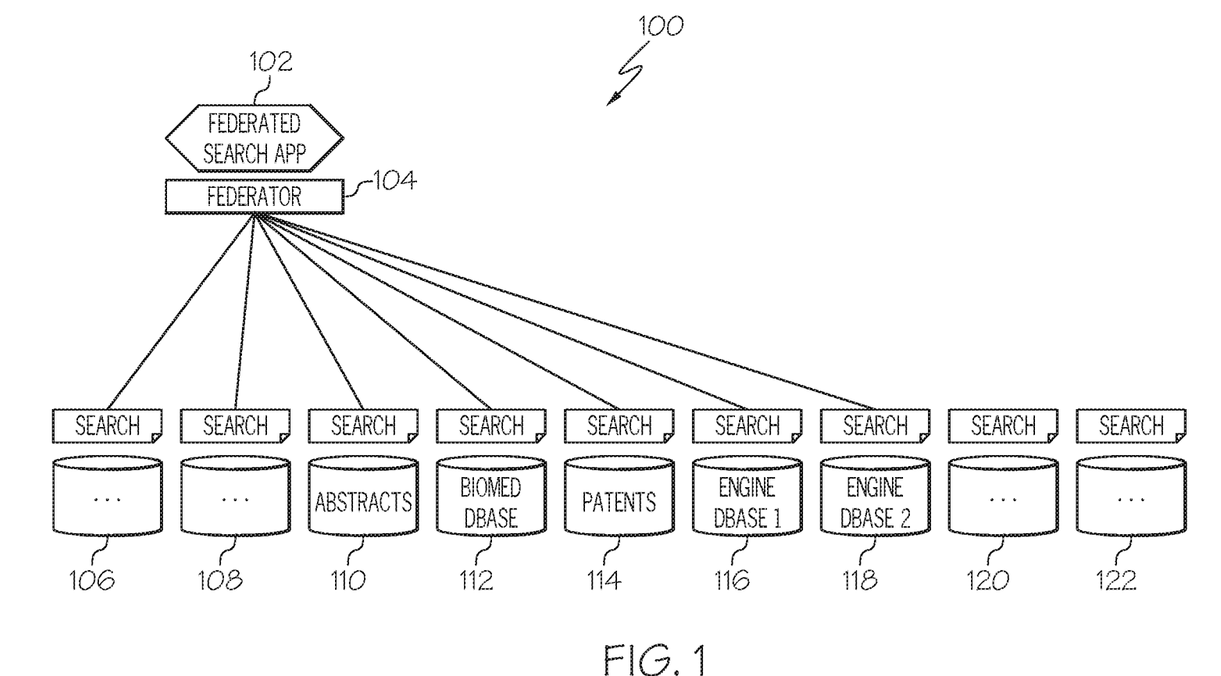
FIG. 1 schematically depicts an example federated search architecture, according to one or more embodiments shown or described herein.

FIG. 1 shows a schematic illustration of an example federated search architecture 100. The federated search architecture 100 of FIG. 1 comprises an exemplary search application 102 provided by Elsevier B.V. of Amsterdam, Netherlands that may be used to search a variety of engineering related corpora. In other examples, other search applications associated with other corpora may be used.

The search application 102 comprises a federator 104 that receives a search query and federates the query to a plurality of endpoints 106-122. Each federated endpoint 106-122 performs a search of a particular corpus and returns the search results to the federator 104. As non-limiting examples, endpoint 110 searches an abstracts database, endpoint 112 searches a biomedical database, endpoint 114 searches a patent database, endpoint 116 searches an engineering research database, and endpoint 118 searches a second engineering database. Other federated endpoints may be included in the federation as well.

In a federated search application, each endpoint performs a search of an associated corpus independently and utilizes its own ranking algorithm to rank the relevancy of documents found. The ranking algorithms used by each of the federated endpoints are often incompatible with each other. In addition, the ranking algorithms of endpoints are often secret and endpoints only return a ranked list of search results without any information about how the rankings were compiled. Thus, it may be difficult for the federated search application to combine and rank the documents returned by different endpoints. Accordingly, the combined search results from all of the federated endpoints may be of limited use.

Alternatively, a federation may contain endpoints that each share statistics or other information used to rank search results. Accordingly, after a federated search application federates a search query to a plurality of endpoints in such a federation, each endpoint may return search results along with local statistics associated with the search results used to rank the relevancy of the search results. Then, after receiving the search results and local statistics from each endpoint, the federated search application may use the local statistics associated with the search results to compile global statistics for all the documents identified by each of the endpoints and use the global statistics to rank each of the documents. This may create a more accurate relevancy ranking of each document returned by the federated endpoints.

In one example, the federated endpoints of a federation may each return term frequency-inverse document frequency (TF-IDF) statistics for each document identified as being relevant to the search query. The federated search application may then use the TF-IDF statistics for all of the returned documents to compile a relevance ranking for each such document (e.g., ranking all of the returned documents by their TF-IDF score). In other examples, other statistics or scoring algorithms may be used instead of TF-IDF. In some examples, the endpoints of the federation may use the Elasticsearch search engine to return search results along with TF-IDF or other statistics.

For some federated search applications, a user may specify the endpoints and corresponding corpora that are to be part of a search. However, a user may not know which endpoints are most appropriate to search for a particular query. Thus, a user may select endpoints for a search that are either over inclusive or under inclusive. Accordingly, this disclosure provides systems and methods for analyzing a search query and determining which endpoints of a federation are most appropriate for performing a federated search based on the query.

In addition, a search for a particular query may be best performed by searching a subset of one or more corpora associated with one or more endpoints. This may particularly be the case when an endpoint is associated with a corpus comprising multiple document types. For example, an exemplary science search application may contain a corpus comprising scientific journals, textbooks, and other types of documents. When a user inputs a query into the exemplary science search application, all of the documents within the associated corpus are searched. However, a user may wish to search only journal articles or only textbook chapters. In a typical search application, this would require creating a new corpus containing the desired content (e.g., only journal articles) and then re-indexing the new corpus. However, using the techniques described herein, a subset of a corpus may be searched, as explained further below.

Figure 2:
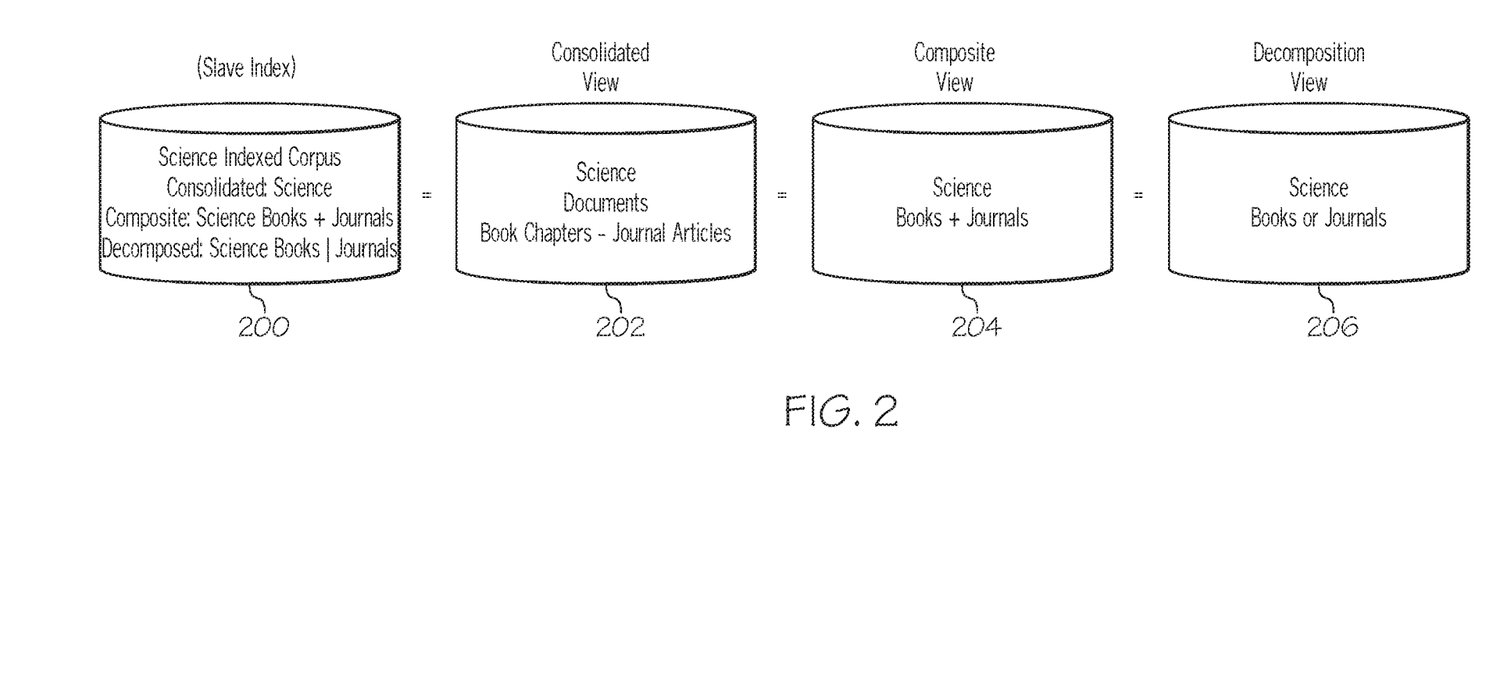
FIG. 2 schematically depicts an example indexed corpus, according to one or more embodiments shown or described herein.

When a corpus contains multiple document types, there are a variety of ways that the corpus may be indexed, as shown in FIG. 2. FIG. 2 shows a schematic view of a corpus of documents 200 that contains books and journals. In one example, the corpus 200 may be arranged as a consolidated or monolithic corpus, as shown in consolidated view 202, in which the entire corpus is treated as a single, homogenous body with the index not distinguishing between the different document types. When searching a consolidated corpus, a search application may search the entire corpus but may not treat each document type differently.

In another example, the corpus 200 may be arranged as a composite corpus, as shown in composite view 204, with different document types stored in different logical partitions of the corpus. When searching a composite corpus, a search application may search the entire corpus and may treat each document type differently (e.g., weighting one document type more heavily than another).

In another example, the corpus 200 may be arranged as a decomposed corpus, as shown in decomposition view 206, in which each document type is stored in a different logical partition and only one partition may be searched at a time. Thus, when searching a decomposed corpus, a search application must select which partition to search (e.g., which document type to search).

In this disclosure, endpoints that are to be part of a federation used with the systems disclosed herein include a field in their index that identifies the type of each document in a corpus. This field may be created when the search index is created (at index time). Thus, the endpoints of the federation may be searched as either a consolidated corpus, a composite corpus, or a decomposed corpus. This also allows for a federated search to be performed across a portion or subset of corpora associated with one or more federated endpoints. Specifically, if a subset of a corpus containing only a certain document type is to be searched, the field in the index identifying the document type may be searched to ensure that only documents of the appropriate type are included in the search results.

This essentially allows for a logical decomposition of the search index. In the example discussed above, using the field of the search index that identifies the type of document in a corpus allows a search index to be decomposed into an index of journal articles and an index for textbooks. This allows the index to be searched for only journal articles or only textbooks in a similar manner as if two separate indexes were created, without the need to create two separate indexes. Furthermore, each logical decomposition of the search index may be treated as a separate endpoint. That is, the journal articles in a corpus may be treated as one endpoint and the textbooks in the corpus may be treated as a different endpoint.

In addition to the example above of using a field in the index to identify the type of a document, other fields in the index may be used to identify other features of documents in a corpus that may be used to form a logical decomposition of the search index. For example, in a corpus of medical journal articles, certain articles may be related to cancer and it may be desirable to have a separate index of only cancer-related journal articles. In traditional search applications, this might be accomplished by a subject matter expert reviewing all the articles in the corpus, identifying those that are cancer-related and adding the cancer-related articles to the new index. However, this may be time and resource intensive.

Alternatively, using the techniques described herein, the index for the corpus may have a field that identifies the subject matter of a document. Then, at index time, if a document is cancer-related, this field may be set to cancer. Thus, after the index is complete, the index may be searched either for all documents in the corpus, or for only cancer-related documents in the corpus. This may be similar to a view in a database, where a subset of the database may be easily accessed by referring to the view. Similarly, in the present disclosure, using one or more fields of the search index allows different subsets of an index and its associated corpus to be searched without the need to re-index the corpus.

Figure 3:
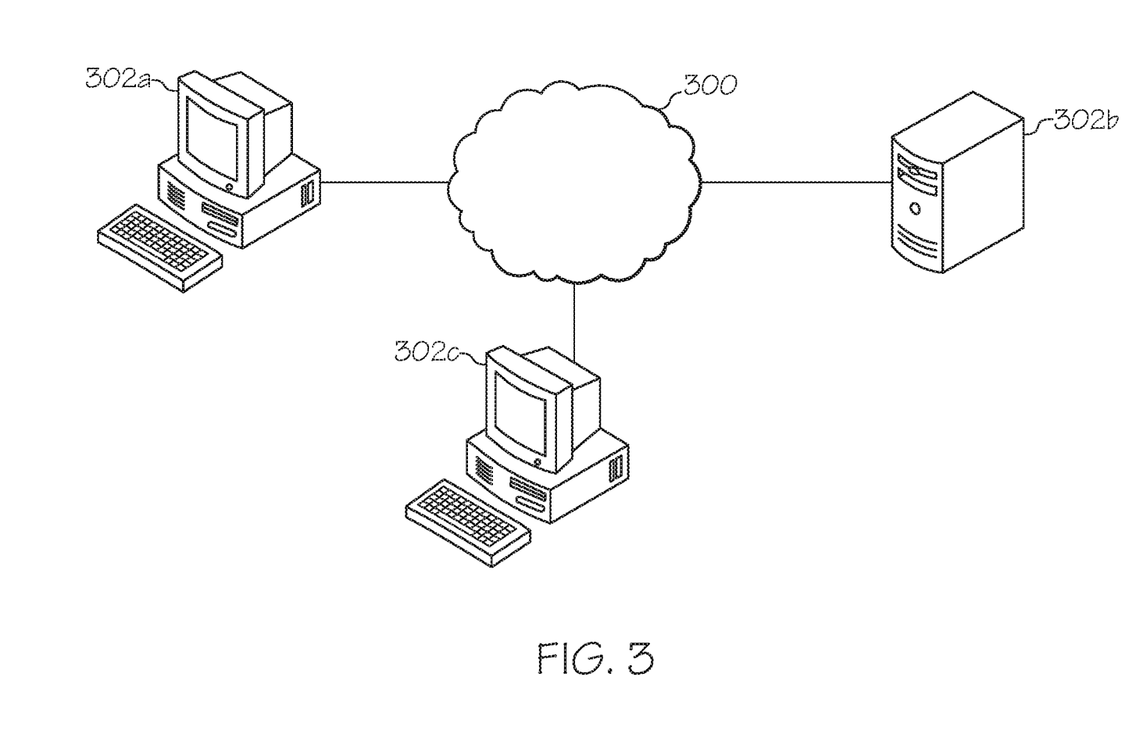
FIG. 3 schematically depicts an illustrative computing network for a system for performing federated search according to one or more embodiments shown and described herein.

Referring now to FIG. 3, an illustrative computing network is depicted, illustrating components of a system for performing the functions described herein, according to embodiments shown and described herein. As illustrated in FIG. 3, a computer network 300 may include a wide area network, such as the internet, a local area network (LAN), a mobile communications network, a public service telephone network (PSTN) and/or other network and may be configured to electronically connect a user computing device 302a, a server computing device 302b, and an administrator computing device 302c.

The user computing device 302a may be used to facilitate federated searching, display and receive input from a graphical user interface used to perform such federated searching, and display a result set of documents and information pertaining to the result set of documents. The user computing device 302a may also be utilized to perform other user functions.

The administrator computing device 302c may, among other things, perform administrative functions for the server computing device 302b. In the event that the server computing device 302b requires oversight, updating, or correction, the administrator computing device 302c may be configured to provide the desired oversight, updating, and/or correction.

The server computing device 302b may receive a search query from the user computing device 302a and may perform a federated search using the techniques disclosed herein, thereby functioning as a federated search application. After performing the federated search and identifying the result set of documents, the server computing device 302b may transmit the result set of documents to the user computing device 302a such that the user computing device 302a may display the result set of documents. The components and functionality of the server computing device 302b will be set forth in detail below.

It should be understood that while the user computing device 302a and the administrator computing device 302c are depicted as personal computers and the server computing device 302b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 3 as a single piece of hardware, this is also merely an example. More specifically, each of the user computing device 302a, the server computing device 302b, and the administrator computing device 302c may represent a plurality of computers, servers, databases, etc.

Figure 4:
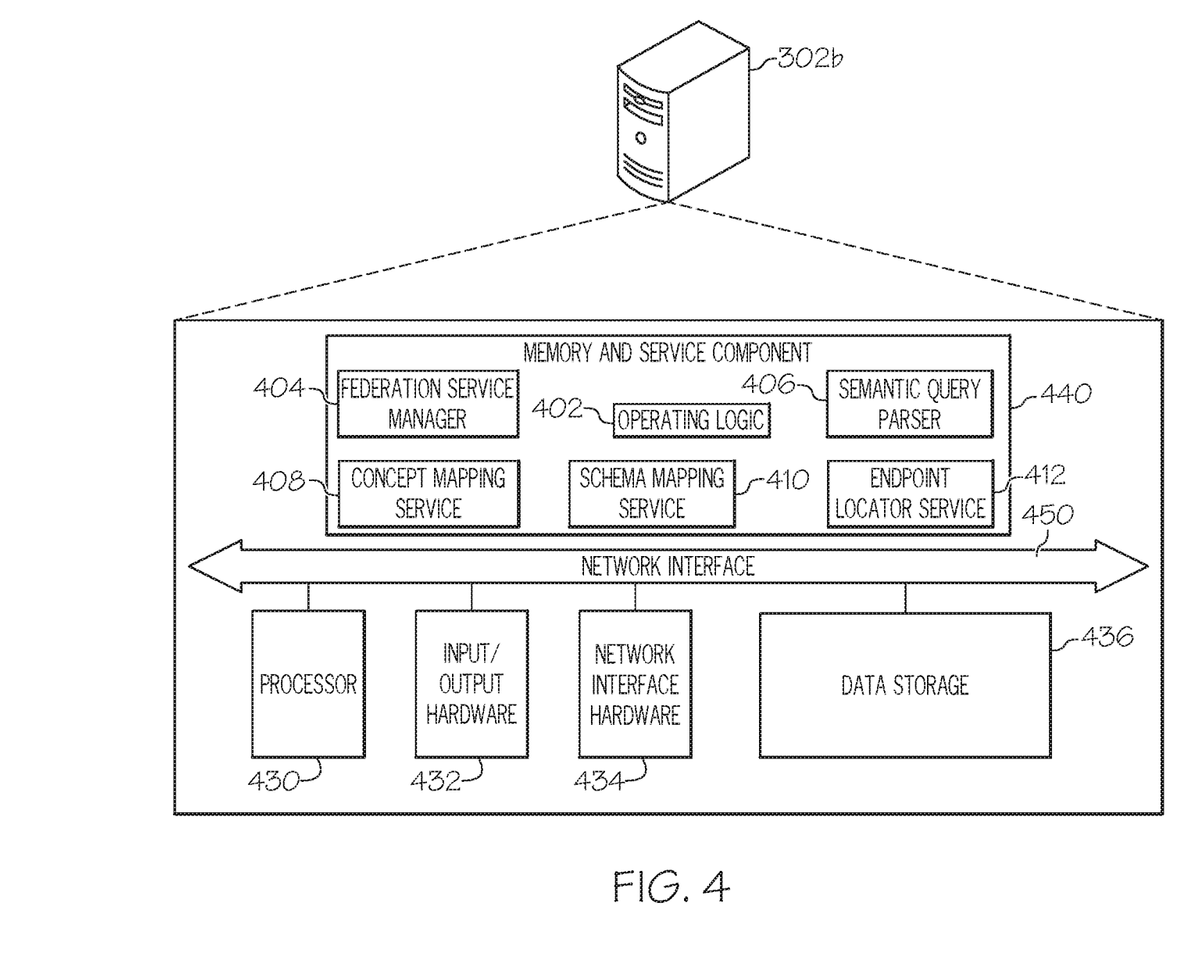
FIG. 4 schematically depicts the server computing device from FIG. 3, further illustrating hardware and software that may be used in performing a federated search according to one or more embodiments shown and described herein.

FIG. 4 depicts additional details regarding the server computing device 302b from FIG. 3. While in some embodiments, the server computing device 302b may be configured as a general purpose computer with the requisite hardware, software, and/or firmware, in some embodiments, that server computing device 302b may be configured as a collection of cooperating computing devices or even as a special purpose computer designed specifically for performing the functionality described herein.

As also illustrated in FIG. 4, the server computing device 302b may include a processor 430, input/output hardware 432, network interface hardware 434, a data storage component 436, and a non-transitory memory and service component 440. The memory and service component 440 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory and service component 440 may be configured to store operating logic 402, a federation service manager 404, a semantic query parser 406, a concept mapping service 408, a schema mapping service 410, and an endpoint locator service 412 (each of which may be embodied as a computer program, firmware, or hardware, as an example). A network interface 450 is also included in FIG. 4 and may be implemented as a bus or other interface to facilitate communication among the components of the server computing device 302b.

The processor 430 may include any processing component configured to receive and execute instructions (such as from the data storage component 436 and/or memory and service component 440). The input/output hardware 432 may include a monitor, keyboard, mouse, printer, camera, microphone, speaker, touch-screen, and/or other device for receiving, sending, and/or presenting data. The network interface hardware 434 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 436 may reside local to and/or remote from the server computing device 302b and may be configured to store one or more pieces of data for access by the server computing device 302b and/or other components. Data may be stored in the data storage component 436 to provide support for functionalities described herein.

Included in the memory and service component 440 are operating logic 402, the federation service manager 404, the semantic query parser 406, the concept mapping service 408, the schema mapping service 410, and the endpoint locator service 412. The operating logic 402 may include an operating system and/or other software for managing components of the server computing device 302*b*. Similarly, the federation service manager 404 may control operation of the federated search functionality described herein. The semantic query parser 406 may analyze a query and identify searchable, semantic concepts within the query. The concept mapping service 408 may map semantic concepts to specific federated endpoints. The schema mapping service 410 may map a received query to a query having appropriate syntax for particular endpoints. The endpoint locator service 412 may locate federated endpoints. The functionalities of the federation service manager 404, the semantic query parser 406, the concept mapping service 408, the schema mapping service 410, and the endpoint locator service 412 will be described in further detail below.

It should be understood that the components illustrated in FIG. 4 are merely illustrative and are not intended to limit the scope of this disclosure. More specifically, while the components in FIG. 4 are illustrated as residing within the server computing device 302*b*, this is a non-limiting example. In some embodiments, one or more of the components may reside external to the server computing device 302*b*. Similarly, while FIG. 4 is directed to the server computing device 302*b*, other components such as the user computing device 302*a* and the administrator computing device 302*c* may include similar hardware, software, and/or firmware.

Figure 5:
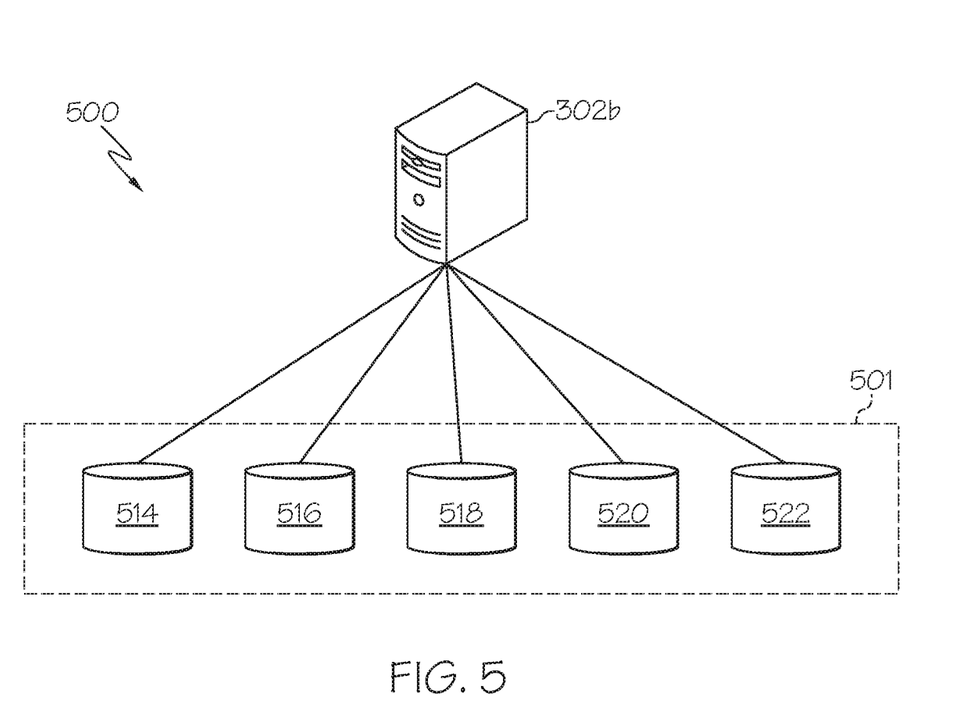
FIG. 5 schematically depicts a system including the server computing device of FIG. 3 and a federation of search endpoints, according to one or more embodiments shown or described herein.

As mentioned above, the various components described with respect to FIG. 4 may be used to carry out one or more processes and/or provide functionality for performing a federated search. An illustrative example of the various processes is described with respect to FIG. 7. Although the steps associated with the blocks of FIG. 7 will be described as being separate tasks, in other embodiments, the blocks may be combined or omitted. Further, while the steps associated with the blocks of FIG. 7 will be described as being performed in a particular order, in other embodiments, the steps may be performed in a different order Referring now to FIG. 5, a system 500 is shown for performing federated searches according to the present disclosure. The system 500 comprises the server computing device 302*b* and a federation 501 comprising a plurality of federated endpoints 514, 516, 518, 520, 522. For purposes of illustration, the user computing device 302*a* and the administrator computing device 302*c* are not shown but may be included in the system 500 as well. In the example of FIG. 5, five federated endpoints are shown as being part of the federation 501. However, it should be understood that the federation 501 of the system 500 may include any number of federated search endpoints. Each endpoint 514, 516, 518, 520, 522 of the federation 501 may operate as a federated endpoint in conjunction with the server computing device 302*b* to perform a federated search. In addition, each endpoint 514, 516, 518, 520, 522 may operate as a stand-alone search application, as discussed in further detail below in connection with FIG. 6. The server computing device 302*b* may access the endpoints of the federation 501 to perform federated searching as described in further detail herein (e.g., via the network interface hardware 434). In some examples, the endpoints of the federation 501 may reside locally on the server computing device 302*b* (e.g., in the data storage component 436).

Figure 6:
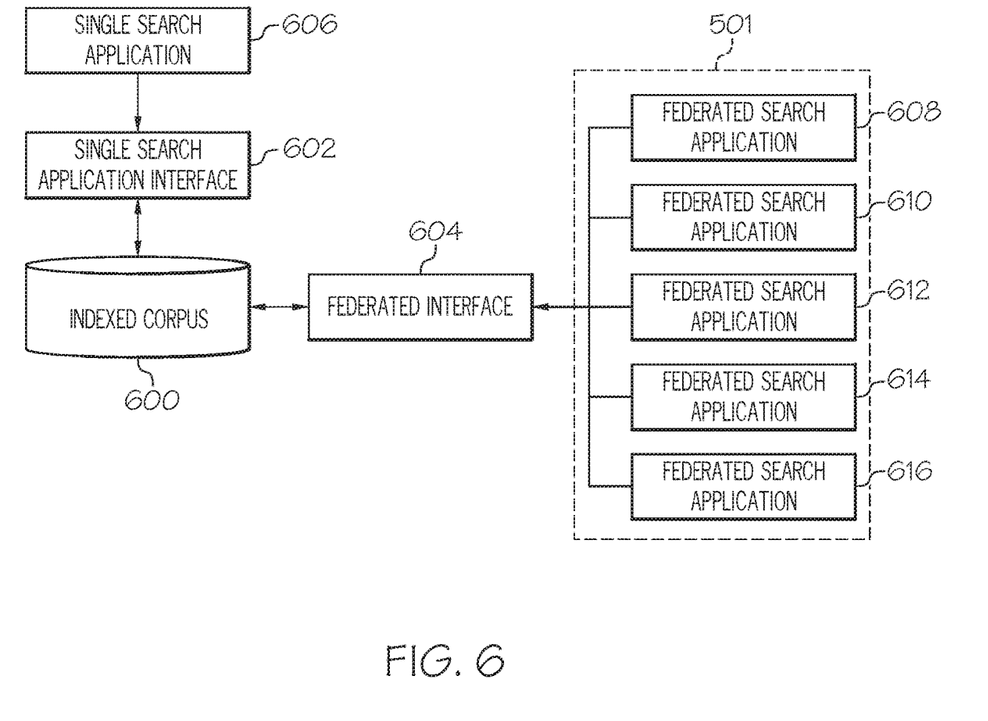
FIG. 6 schematically depicts an example indexed corpus having a single search application interface and a federated interface, according to one or more embodiments shown or described herein.

FIG. 6 shows a schematic representation of an indexed corpus of documents 600 associated with an endpoint (e.g., endpoint 514 of FIG. 5). The corpus 600 has a single search application interface 602 and a federated interface 604. The single search application interface 602 may provide an interface to a single search application 606 (e.g., a stand-alone search application). In addition, the federated interface 604 may provide an interface to one or more federated search applications (e.g., federated search applications 608, 610, 612, 614, 616 or to the server computing device 302*b* of FIG. 3). As such, the indexed corpus 600 may be used as a stand-alone search application or in conjunction with a federated search application.

When operating as a stand-alone search application, such as with single search application 606, a search query is received from a user through the single search application interface 602. The corpus 600 is then searched based on the received search query and search results are returned to the single search application 606 through the single search application interface 602. Alternatively, when operating in conjunction with a federated search application, such as federated search application 608, a search query is received from the federated search application 608 through the federated interface 604. The corpus 600 is then searched and the search results are returned to the federated search application 608 through the federated interface 604. In practice, the corpus 600 may simultaneously supply search results to single search applications and contribute results to federated search applications. Furthermore, each federated search application 608, 610, 612, 614, 616 may utilize a plurality of endpoints such as the corpus 600.

Referring back to FIG. 5, each endpoint 514, 516, 518, 520, 522 is configured to use one or more relevancy statistics to order search results based on relevancy to a search query and to share the relevancy statistics with the server computing device 302*b*. In the illustrated example, the endpoints 514, 516, 518, 520, 522 use TD-IDF statistics to order the relevancy of search results. However, in other examples, other relevancy statistics may be used. The endpoints 514, 516, 518, 520, 522 each share their local relevancy statistics with the server computing device 302*b* in order for the server computing device 302*b* to provide global relevancy statistics.

Referring back to FIG. 4, the components of the memory and service component 440 of the server computing device 302*b* will be described. The endpoint locator service 412 comprises a catalog of available federated endpoints that may be accessed to perform a search (e.g., endpoints 514, 516, 518, 520, 522). In addition, the endpoint locator service 412 may maintain an index or catalog of the content subsets available at each federated endpoint and the syntax required to access each content subset. The catalog maintained by the endpoint locator service 412 may include a location of each federated endpoint of the federation 501 such that each endpoint may be accessed as needed. The location of each endpoint may be maintained dynamically to increase flexibility of the system 500 for endpoints that are not hardwired to a particular location.

The endpoint locator service 412 may maintain an electronic catalog of federated search endpoints for consolidated indexes as well as for logical document collections within a composite index. Content subsets of federated endpoints may include content from consolidated indexes, subsets that are decomposed from composite indexes, or collections of content within a composite index (e.g., all biology journals or all physics textbooks).

The endpoint locator service 412 may also maintain information regarding the query syntax required to access each available content subset of each federated endpoint of the federation 501. Thus, if different endpoints and different content subsets within endpoints require different syntax to access and search them, the endpoint locator service 412 is able to ensure that the server computing device 302*b* searches each endpoint or content thereof with the appropriate syntax. Specifically, when a particular query is received by the server computing device 302*b*, the endpoint locator service 412 may map the received query to a query having the appropriate syntax for each endpoint or subset that of that is to be searched. This may be done using the schema mapping service 410, described below.

Each endpoint within the federation 501 may have particular schema that describes the searchable fields within the index for the endpoint. When a particular index has different names for the same field for different portions of the corpus associated with the index, the schema may provide a mapping between the different field names. For example, an endpoint may be associated with a corpus that has books and pamphlets. The books may have a title field "books title" and the pamphlets may have a title field "pamphlets title." Accordingly, a query against titles in the corpus may search both title fields to search the entire corpus. Thus, each endpoint in the federation 501 may provide this schema information to the server computing device 302*b*, and this information may be managed by the schema mapping service 510.

The schema mapping service 410 may maintain a list of the schema for each endpoint in the federation 501 and the available content subsets within each endpoint in the federation 501. Thus, when the server computing device 302*b* receives a query and certain endpoints of the federation 501 are to be searched, the federation service manager 404 may access the schema mapping service 410 to determine the appropriate schema to use to search each desired endpoint and to map the received query to an appropriate query to send to each such endpoint.

When performing a federated search, a user may have a specific set of endpoints that they wish to search over a search query. In this case, a user may specify the particular endpoints to be searched, and the search query may be federated to the specified endpoints. However, in many cases, a user may not know which endpoints are most appropriate to search for a particular search query. Accordingly, the server computing device 302*b* may determine which endpoints of a federation are most appropriate to search for a particular query, as explained below.

The semantic query parser 406 may analyze a query received by the server computing device 302*b* and may identify semantic concepts within the query. This may be done by performing a semantic analysis of the query. In some examples, the semantic query parser 406 uses natural language processing software such as, without limitation, spaCy or Natural Language Toolkit to identify semantic concepts within the query. In other examples, other methods may be used to identify concepts within the query. For example, if the server computing device 302*b* received the query "heart valve materials," the semantic query parser 406 may identify "heart valve" as one semantic concept contained in the query and "materials" as another semantic concept in the query. In another example, if the server computing device 302*b* received the query "heart valve material patents," the semantic query parser 306 may identify "heart valve" as a semantic concept, "material" as a semantic concept, and also "patents" as a third semantic concept.

Once the semantic query parser 406 identifies semantic concepts within a query, the concept mapping service 408 may map the identified semantic concepts to specific federated endpoints. Each endpoint may have a high-order representation or meta-index that broadly identifies the types of topics that are contained in the corpus or corpora associated with the endpoint. For example, a meta-index for a particular endpoint may include topics such as "medical" or "patents." Thus, the concept mapping service 408 may search the meta-index of each endpoint to map the semantic concepts identified by the semantic query parser 406 to specific endpoints to be searched. In other examples, the concept mapping service 408 may search the index of endpoints rather than a meta-index to map semantic concepts to particular endpoints.

In the example above regarding the query "heart valve material patents," in which the semantic query parser 406 identified the semantic concepts "heart valve," "material," and "patents," the concept mapping service 408 may access the index or meta-index of each endpoint of the federation 501 and select only the endpoints that have one or more of these topics listed in their index as endpoints to be searched. In this example, the concept mapping service 408 may identify endpoints associated with medical, engineering, and patent corpora as endpoints that should be searched. For example, the concept mapping service 408 may identify endpoints that have corpora containing medical journals, engineering journals, and patent databases.

In addition, the concept mapping service 408 may identify one or more subsets of corpora associated with one or more endpoints of the federation to be searched. For example, endpoint 518 may have a corpus including patents and other types of documents. For the "heart valve materials patent" query, the concept mapping service 408 may determine that a portion of the corpus related to patents should be searched but that the remainder of the corpus should not be searched. Once the concept mapping service 408 identifies one or more endpoints of subsets thereof to be searched, the query may be federated to the identified endpoints.

Figure 7:
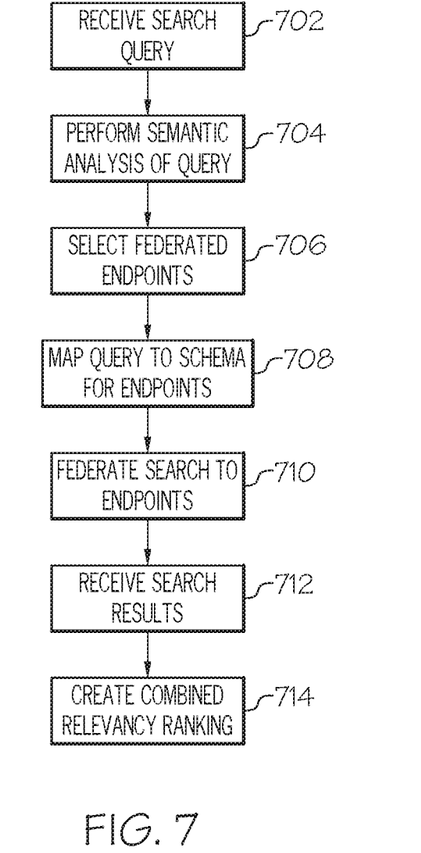
FIG. 7 depicts a flowchart of an example method for performing federated search, according to one or more embodiments shown and described herein.

FIG. 7 depicts a flowchart of an example method for performing a federated search by the system 500. At step 702, a search query is received by the server computing device 302*b*. The federation service manager 404 then calls the semantic query parser 406 to perform semantic analysis of the received query.

At step 704, the semantic query parser 406 analyzes the query to identify one or more semantic concepts contained within the query. The semantic query parser 406 may also identify one or more types of corpora that are likely to contain appropriate search results. The federation service manager 404 then passes the semantic concepts identified by the semantic query parser 406 to the concept mapping service 408.

At step 706, the concept mapping service 408 accesses the endpoint locator service 412 to locate endpoints of the federation 501 that are likely to contain search results relevant to the search query. The endpoint locator service 412 maintains a list of all available endpoint of the federation 501 and searchable subsets thereof. As such, by accessing the endpoint locator service 412, the concept mapping service 408 may determine which endpoints of the federation 501 are appropriate to search based on the concepts identified by the semantic query parser 406.

In some examples, the concept mapping service 408 may identify endpoints of the federation 501 that have associated corpora similar to the types of corpora identified by the semantic query parser 406 (e.g., medical, engineering, and patent-related corpora in the example discussed above). In some examples, the concept mapping service 408 may identify endpoints of the federation 501 that have subsets of corpora (e.g., composite or decomposed corpora) similar to the types of corpora identified by the semantic query parser 406. The concept mapping service 408 may also identify endpoints based on current service load of the endpoints, location of the endpoints, or other factors related to the performance of the endpoints. The federation service manager 404 may cache the endpoints identified by the concept mapping service 408 for later use.

At step 708, the federation service manager 404 calls the schema mapping service 410 to map the search query to the appropriate schema for each endpoint identified by the concept mapping service 408. The schema mapping service 410 may call the endpoint locator service 412 to identify the appropriate query syntax for each of the identified endpoints. Then, for each of the identified endpoints, the schema mapping service 410 creates an appropriately formatted query to search the endpoint based on the query syntax stored in the endpoint locator service 412 and the received search query. In examples where the concept mapping service 408 identifies a subset of content associated with an endpoint to be searched, the schema mapping service 410 may create a query that will cause only the appropriate subset to be searched.

At step 710, the federation service manager 404 federates the search query to each of the endpoints identified by the concept mapping service 408. This involves sending a query to each identified endpoint using the query syntax created by the schema mapping service 410. The federation service manager 404 may call the endpoint locator service 412 to identify the location of each identified endpoint. Each identified endpoint then receives a search query with the appropriate syntax and performs a search of the appropriate content associated with the endpoint based on the received query. After the identified endpoints perform their search, each endpoint returns search results to the federation service manager 404 along with local relevancy statistics (e.g., TF-IDF statistics) that may be used by the federation service manager 404 to create a global relevancy ranking for all returned search results.

At step 714, after receiving the search results and local relevancy statistics from each of the identified endpoints, the federation service manager 404 uses all of the local relevancy statistics to create a global relevancy ranking for all of the search results. For example, if each endpoint returns TF-IDF statistics for each search result, the federation service manager 404 may order each search result returned by all of the identified endpoints by their TF-IDF score. The federation service manager 404 then returns the search results and the relevancy ranking to the user (e.g., by transmitting the search results and the relevancy ranking to the user computing device 302*a* where they may be displayed to a user).

It should now be understood that embodiments described herein are directed to systems, apparatus, and methods for performing federated search. A federated search application may receive a search query and may analyze the query to identify one or more semantic concepts contained within the query. The federated search application may then determine one or more endpoints to perform a search based on the identified semantic concepts and may federate the search to the identified endpoints. The identified endpoints may then perform a search of their associated corpora, which may include composite or decomposed corpora, and return search results to the federated search application along with local relevancy statistics for the search results.

The federated search application may receive the search results from each of the identified endpoints along with the local relevancy statistics and may combine the search results and the local relevancy statistics to obtain combined search results with global relevancy statistics. The federated search endpoint may order the combined search results based on the global relevancy statistics and present the ordered search results to the user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
    receiving at a computing device, a search query;
    receiving, at the computing device, data associated with a plurality of federated search endpoints and a syntax required to access each federated search endpoint, wherein each federated search endpoint is associated with a corpus of documents;
    performing, by the computing device, a semantic analysis of the search query to identify one or more semantic concepts contained within the query;
    selecting, by the computing device, one or more of the federated search endpoints based on the one or more identified semantic concepts;
    creating, by the computing device, a formatted search query for each of the selected one or more federated search endpoints based on the search query and the syntax required to access each federated search endpoint;
    performing, by the computing device, a search of the selected one or more federated search endpoints based on the formatted search query;
    receiving statistics associated with the search results from each of the one or more federated search endpoints; and
    ordering the search results based on the statistics associated with the search results.

2. The method of claim 1, further comprising:
    selecting one or more subsets of the one or more federated search endpoints based on the semantic analysis; and
    performing a search of the of the one or more federated search endpoints based on the search query.

3. The method of claim 1, wherein performing the semantic analysis of the search query comprises using a natural language processing kit to identify the one or more semantic concepts.

4. The method of claim 3, further comprising:
    comparing each of the one or more identified semantic concepts to a plurality of indexes associated with a plurality of corpora; and
    selecting the one or more federated search endpoints associated with corpora from among the plurality of corpora based on the comparisons.

5. The method of claim 1, wherein performing the search of the one or more federated search endpoints comprises:
submitting the formatted search query associated with each of the one or more federated search endpoints to one or more search applications associated with each of the one or more federated search endpoints;
receiving search results from each of the one or more search applications; and
merging the search results from each of the one or more search applications.

6. The method of claim 1, further comprising ordering the search results by relevancy of the search results to the search query based on the statistics associated with the search results.

7. The method of claim 1, wherein the statistics associated with the search results comprise relevancy statistics.

8. A system for performing federated search, the system comprising:
a processing device; and
a non-transitory, processor-readable storage medium comprising one or more programming instructions stored thereon that, when executed, cause the processing device to:
receive a search query from a user;
perform semantic analysis of the search query and identify one or more semantic concepts contained in the search query;
store data associated with a plurality of federated search endpoints and a syntax required to access each federated search endpoint, wherein each federated search endpoint is associated with a corpus of documents;
select one or more federated search endpoints based on the identified semantic concepts; and
create a formatted search query for each of the one or more federated search endpoints based on the search query and the syntax required to access each federated search endpoint.

9. The system of claim 8, wherein the programming instructions further cause the processing device to receive search results from the one or more federated search endpoints and combine the search results to obtain combined search results for presentation to the user.

10. The system of claim 9, wherein the programming instructions further cause the processing device to:
receive statistics from the one or more federated search endpoints, the statistics being associated with relevancy of the search results to the search query; and
arrange the combined search results in an order of relevancy to the search results based on the statistics.

11. The system of claim 10, wherein the statistics comprise relevancy statistics.

12. The system of claim 8, wherein the programming instructions further cause the processing device to:
select one or more subsets of content associated with the one or more federated search endpoints based on the identified semantic concepts; and
create the formatted search query for each of the one or more subsets of content associated with the one or more selected federated search endpoints based on the search query and the syntax required to access each federated search endpoint.

13. A system for performing federated search, the system comprising:
a federation of one or more endpoints;
a processing device; and
a non-transitory, processor-readable storage medium comprising one or more programming instructions stored thereon that, when executed, cause the processing device to:
receive a search query;
store data associated with each of the endpoints and a syntax required to access each of the endpoints;
create a formatted search query for one or more of the endpoints based on the search query and the syntax required to access the endpoints; and
federate the search query to the one or more of the endpoints of the federation by submitting the formatted search query to each of the one or more endpoints;
wherein:
each of the endpoints of the federation is associated with a corpus of documents; and
each of the endpoints of the federation is configured to receive a formatted search query, perform a search of the corpus associated with the endpoints, and return search results along with statistics associated with relevancy of the search results.

14. The system of claim 13, wherein the statistics associated with the relevancy of the search results comprise relevancy statistics.

15. The system of claim 13, wherein:
at least one of the formatted search queries submitted to at least one of the endpoints of the federation indicates that a subset of the corpus associated with the endpoint is to be searched.

16. The system of claim 15, wherein the at least one of the formatted search queries indicates that only documents of one or more document types in the corpus associated with the endpoint are to be searched.

17. The system of claim 16, wherein:
at least one of the endpoints of the federation comprises an index, the index including a document type field to identify a document type of each document in the associated corpus; and the at least one of the formatted search queries specifies one or more values for the document type field to indicate the one or more documents types in the corpus associated with the endpoint to be searched.

* * * * *